United States Patent
Dayanandan et al.

(10) Patent No.: US 9,985,749 B2
(45) Date of Patent: *May 29, 2018

(54) METHOD AND SYSTEM FOR IMPROVING WIRELESS LINK EFFICIENCY

(71) Applicant: Ubiquiti Networks, Inc., San Jose, CA (US)

(72) Inventors: Sriram Dayanandan, Dublin, CA (US); Darius Ivanauskas, Kaunas (LT); Mindaugas Kriauciunas, Kaunas (LT); Antanas Gadeikis, Kaunas (LT); Kestutis Barkauskas, Kaunas (LT)

(73) Assignee: Ubiquiti Networks, Inc., New York, NY (US)

( * ) Notice: Subject to any disclaimer, the term of this patent is extended or adjusted under 35 U.S.C. 154(b) by 234 days.

This patent is subject to a terminal disclaimer.

(21) Appl. No.: 15/098,223

(22) Filed: Apr. 13, 2016

(65) Prior Publication Data

US 2016/0226626 A1  Aug. 4, 2016

Related U.S. Application Data

(63) Continuation of application No. 14/082,006, filed on Nov. 15, 2013, now Pat. No. 9,386,129, which is a
(Continued)

(51) Int. Cl.
*H04W 84/12* (2009.01)
*H04L 1/08* (2006.01)
(Continued)

(52) U.S. Cl.
CPC .............. *H04L 1/08* (2013.01); *G06F 11/076* (2013.01); *G06F 11/0709* (2013.01);
(Continued)

(58) Field of Classification Search
CPC .............. G06F 11/0709; G06F 11/076; G06F 11/0793; H04L 1/08; H04L 1/1614;
(Continued)

(56) References Cited

U.S. PATENT DOCUMENTS 4,726,019 A  2/1988 Adelmann et al.
4,894,823 A  1/1990 Adelmann et al.
(Continued)

FOREIGN PATENT DOCUMENTS

WO  2009146342 A1  12/2009

OTHER PUBLICATIONS

Nasreddine Hajlaoui et al., "A frame aggregation scheduler for QoS-sensitive applications on IEEE 802.11n WLANs" Communications and Information Technology (ICCIT), 2012 International Conference, Jun. 26, 2012, pp. 221-226.
(Continued)

*Primary Examiner* — Khaled Kassim
*Assistant Examiner* — Zhaohui Yang
(74) *Attorney, Agent, or Firm* — Shun Yao; Park, Vaughan, Fleming & Dowler LLP

(57) ABSTRACT

A transmission system can improve transmission efficiency of a wireless link using multi-TID aggregate frames. The system can receive a block acknowledgement from a destination device, in response to sending a first multi-TID aggregate frame to the destination device via a wireless link. The system can compute a packet error rate for a respective TID based at least on the block acknowledgement. If the system determines that the packet error rate for the respective TID is greater than a predetermined threshold, the system can reserve a number of packet slots in a second aggregate frame for duplicate packets of the respective TID. The system may then generate the second multi-TID aggregate frame that includes duplicate packets for the respective
(Continued)

TID in the number of reserved packet slots, and can send the second multi-TID aggregate frame to the destination device via the wireless link.

20 Claims, 6 Drawing Sheets

Related U.S. Application Data continuation of application No. 13/830,385, filed on Mar. 14, 2013, now Pat. No. 9,270,792.

(60) Provisional application No. 61/729,219, filed on Nov. 21, 2012.

(51) Int. Cl.
*H04L 29/08* (2006.01)
*H04L 12/26* (2006.01)
*H04L 12/861* (2013.01)
*H04L 1/16* (2006.01)
*H04L 1/18* (2006.01)
*H04W 28/06* (2009.01)
*G06F 11/07* (2006.01)

(52) U.S. Cl.
CPC ........ *G06F 11/0793* (2013.01); *H04L 1/1614* (2013.01); *H04L 1/1887* (2013.01); *H04L 43/0823* (2013.01); *H04L 49/9057* (2013.01); *H04L 69/324* (2013.01); *H04W 28/06* (2013.01); *H04W 84/12* (2013.01)

(58) Field of Classification Search
CPC ............... H04L 1/1887; H04L 43/0823; H04L 49/9057; H04L 69/324; H04W 28/06; H04W 84/12
See application file for complete search history.

(56) References Cited

U.S. PATENT DOCUMENTS

| | | | |
|---|---|---|---|
| 6,216,167 B1 | 4/2001 | Momirov | |
| 6,662,213 B1 | 12/2003 | Xie et al. | |
| 6,839,868 B1 | 1/2005 | Pignol | |
| 6,976,055 B1 | 12/2005 | Shaffer et al. | |
| 7,395,346 B2 | 7/2008 | Pinder et al. | |
| 8,144,579 B2 | 3/2012 | Elliott | |
| 2002/0041756 A1 | 4/2002 | Kato | |
| 2002/0080819 A1 | 6/2002 | Tsao | |
| 2003/0123466 A1 | 7/2003 | Somekh et al. | |
| 2004/0047308 A1 | 3/2004 | Kavanagh et al. | |
| 2004/0103314 A1 | 5/2004 | Liston | |
| 2004/0117498 A1 | 6/2004 | Hashimoto et al. | |
| 2005/0152358 A1 | 7/2005 | Giesberts et al. | |
| 2005/0265302 A1 | 12/2005 | Nishibayashi et al. | |
| 2006/0034174 A1 | 2/2006 | Nishibayashi et al. | |
| 2006/0136614 A1 | 6/2006 | Kakani et al. | |
| 2007/0110055 A1 | 5/2007 | Fischer et al. | |
| 2008/0056125 A1 | 3/2008 | Kneckt et al. | |
| 2008/0192644 A1 | 8/2008 | Utsunomiya et al. | |
| 2008/0212612 A1 | 9/2008 | Singh et al. | |
| 2008/0240107 A1 | 10/2008 | Parekh et al. | |
| 2009/0046580 A1 | 2/2009 | Botzko et al. | |
| 2011/0188429 A1 | 8/2011 | Seok | |
| 2011/0199953 A1 | 8/2011 | Seok | |
| 2011/0286377 A1 | 11/2011 | Sampath et al. | |
| 2012/0014335 A1 | 1/2012 | Adachi et al. | |
| 2012/0084616 A1 | 4/2012 | Wentink et al. | |
| 2012/0281699 A1 | 11/2012 | Jia et al. | |
| 2012/0320752 A1 | 12/2012 | Gouache et al. | |
| 2013/0039313 A1 | 2/2013 | Hansen et al. | |
| 2013/0107869 A1 | 5/2013 | Abraham et al. | |
| 2013/0229916 A1 | 9/2013 | Isobe et al. | |
| 2014/0269722 A1 | 9/2014 | Uchida | |

OTHER PUBLICATIONS

Lei Zhang et al., "Prediction-Based Link-Layer Dynamic Fragmentation and Aggregation for Wireless Mesh Networks", Computing, Communication, Control, and Management, 2008. CCCM '08. ISECS International Colloquium on, IEEE, Aug. 3, 2008, pp. 582-586.

Abduladhim Ashtaiwi et al., "Utilizing IEEE 802.11n to enhance QoS support in wireless mesh networks", 33rd IEEE Conference on Local Computer Networks Oct. 14, 2008, p. 693, right-hand column, last paragraph.

Tetsu Nakajima et al., "A Simple and Efficient Selective Repeat Scheme for High Throughput WLAN, IEEE802.11n", IEEEVTS Vehicular Technology Conference. Proceedings, IEEE, Apr. 1, 2007, pp. 1302-1306.

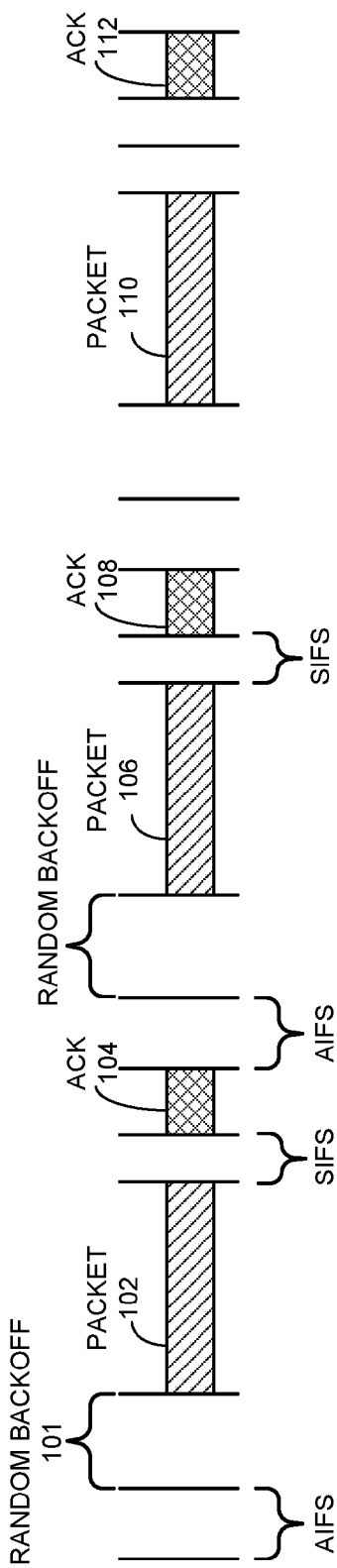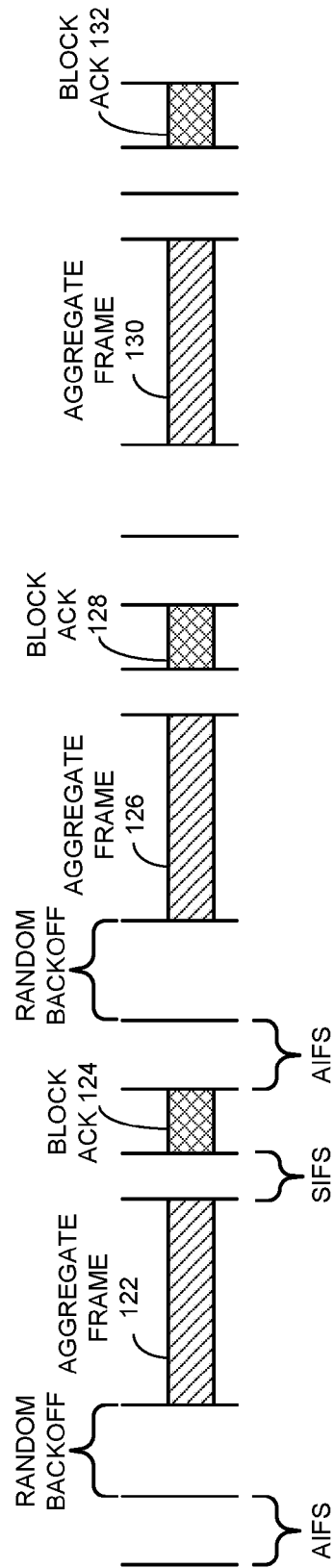
FIG. 1A
FIG. 1B

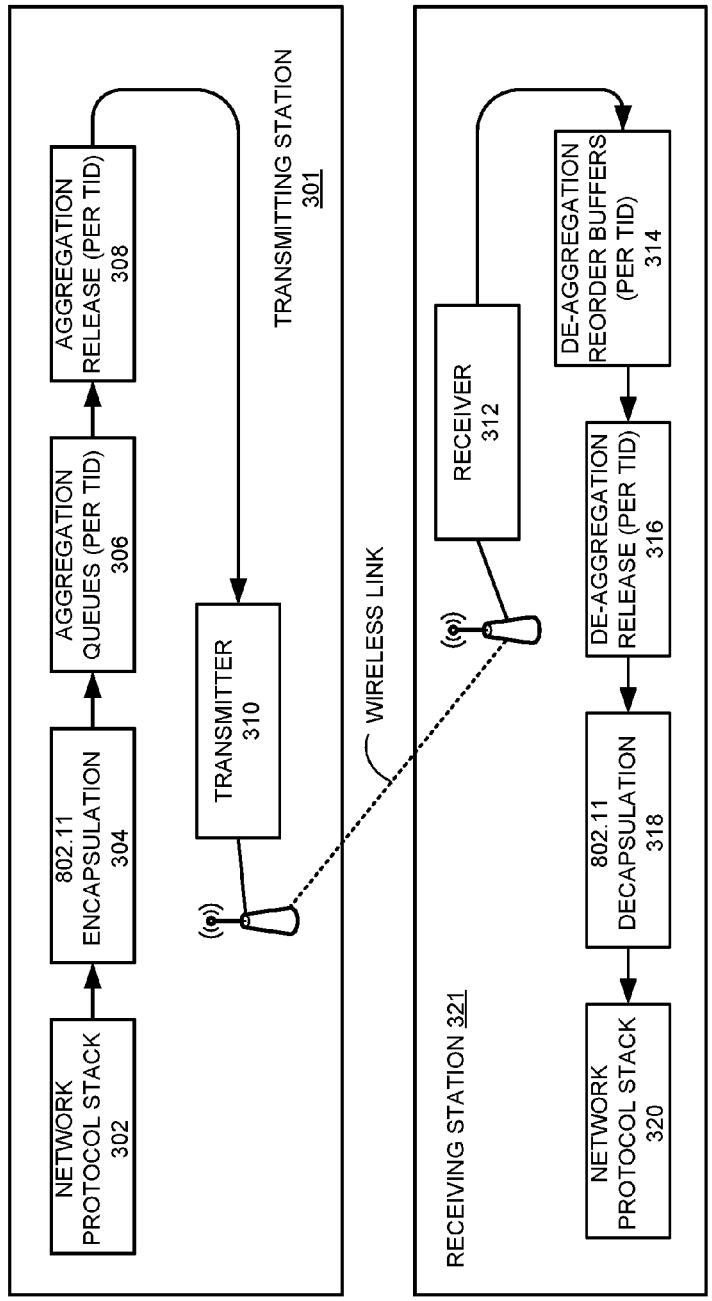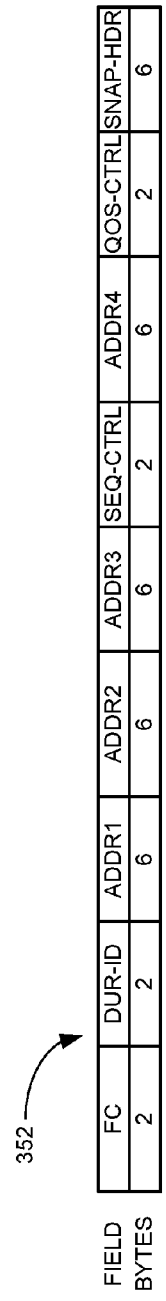
FIG. 3A
FIG. 3B

METHOD AND SYSTEM FOR IMPROVING WIRELESS LINK EFFICIENCY

RELATED APPLICATIONS

This application is a continuation of application Ser. No. 14/082,006, "METHOD AND SYSTEM FOR IMPROVING WIRELESS LINK EFFICIENCY," by inventors Sriram Dayanandan, Darius Ivanauskas, Mindaugas Kriauciunas, Antanas Gadeikis, and Kestutis Barkauskas, filed 15 Nov. 2013, which is a continuation of U.S. application Ser. No. 13/830,385, entitled "METHOD AND SYSTEM FOR IMPROVING WIRELESS LINK EFFICIENCY," by inventors Sriram Dayanandan, Darius Ivanauskas, Mindaugas Kriauciunas, Antanas Gadeikis, and Kestutis Barkauskas, filed 14 Mar. 2013, which claims the benefit of U.S. Provisional Patent Application No. 61/729,219, filed 21 Nov. 2012, entitled "METHOD AND SYSTEM FOR IMPROVING WIRELESS LINK EFFICIENCY."

BACKGROUND

Field

This disclosure is generally related to wireless networks. More specifically, this disclosure is related to a method and system for improving transmission efficiency in a wireless link.

Related Art

In recent years, the phenomenal growth of mobile devices, such as smart phones and tablet computers, has resulted in a huge demand in wireless networks. Particularly, Wi-Fi networks, which are based on the IEEE-802.11 family of standards, are becoming increasingly ubiquitous.

In conventional wired layer-2 networks such as 10base-T, 100base-T, or 1000base-T Ethernet, transmission of a packet is typically not followed by an acknowledgement from the receiver. Reliable data delivery depends on upper layer protocols, such as Transmission Control Protocol (TCP), to acknowledge the sender of received data packets, and to ensure that the sender retransmits a packet in the event of a failed transmission.

Wireless networks such as IEEE 802.11a/b/g/n/ac networks, however, require explicit acknowledgement from the receiver for every packet due to the unreliable nature of the communication medium. In addition, IEEE 802.11a/b/g/n/ac networks use carrier sense multiple access with collision avoidance (CSMA/CA) before beginning any transmission in order to avoid collision with other transmitters. These requirements often lead to low transmission efficiency in IEEE 802.11 wireless links.

SUMMARY

One embodiment of the present invention provides a system for improving transmission efficiency of a wireless link. During operation, the system can receive a block acknowledgement from a destination device, in response to sending a first multi-TID aggregate frame to the destination device via a wireless link. Each of the packets of a respective multi-TID aggregate frame can have the same virtual traffic category indicator (virtual TID) in a corresponding packet header, and two or more packets in the multi-TID aggregate frame can have different original traffic category indicators (TIDs) in a corresponding packet payload. The system can compute a TID packet error rate for a respective TID based at least on the block acknowledgement.

If the system determines that the TID packet error rate for the respective TID is greater than a predetermined threshold, the system can reserve a number of packet slots in a second aggregate frame for duplicate packets of the respective TID. The system may then generate the second multi-TID aggregate frame that includes duplicate packets for the respective TID in the number of reserved packet slots, and can send the second multi-TID aggregate frame to the destination device via the wireless link.

In a variation on this embodiment, the system can compute the TID packet error rate by monitoring an error rate for a respective original traffic category in one or more aggregate frames.

In a variation on this embodiment, a respective reserved packet slot of the second multi-TID aggregate frame can include a duplicate packet that is a duplicate of another packet in the second aggregate frame.

In a further variation, the duplicate packet and the other packet can have the same original TID and the same original sequence number.

In a further variation, the duplicate packet and the other packet can have the same virtual TID and different virtual sequence numbers.

In a variation on this embodiment, the system can send the second multi-TID aggregate frame to the destination device over the wireless link by transmitting the second multi-TID aggregate frame over an IEEE 802.11 wireless link.

In a variation on this embodiment, the packets in the respective multi-TID aggregate frame can have continuous virtual sequence numbers.

In a variation on this embodiment, the packets in the respective multi-TID aggregate frame can have non-continuous original sequence numbers.

BRIEF DESCRIPTION OF THE FIGURES

FIG. 1A illustrates an example of transmitting three packets in an IEEE 802.11a/b/g network.

FIG. 1B illustrates an example of transmitting three aggregate frames in an IEEE 802.11n network.

FIG. 3A presents a block diagram illustrating the operation of aggregating multiple packets and transmitting the aggregate frame over a wireless link to a receiver.

FIG. 3B illustrates a conventional IEEE 802.11n packet header format.

DETAILED DESCRIPTION

Figure 2A:
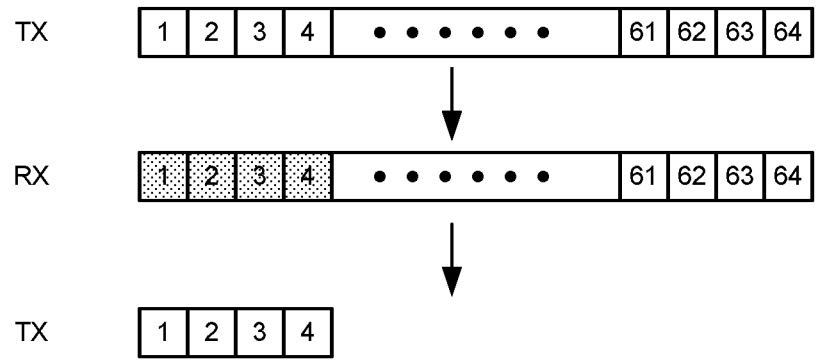
FIG. 2A illustrates a retransmission process in a conventional wireless network where the first four packets in an aggregate frame, which includes 64 packets, are not received successfully.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Some embodiments of the present invention enhance the transmission efficiency in IEEE 802.11 wireless links by using virtual sequence numbers for packets transmitted in an aggregate frame, which allows packets to be retransmitted with other regular packets in an aggregate frame that can accommodate the maximum number of packets. In particular, the virtual sequence number can be arbitrary, and be selected in such a way that allows any number of packets to be retransmitted with other regular packets in the same aggregate frame which is not limited by the acknowledgement window and can be filled up to the maximum allowable number of packets.

As mentioned earlier, the fact that IEEE 802.11 networking standards require per-packet acknowledgement, and that the transmission is based on CSMA/CA, results in fairly inefficient utilization of the wireless bandwidth, regardless of how high the transmission data rate is. Such inefficiencies are illustrated in the examples presented in FIGS. 1A and 1B.

FIG. 1A illustrates an example of transmitting three packets in an IEEE 802.11a/b/g network, which does not provide aggregated packet transmission. In this example, when a transmitter has packets to transmit, it first waits for a fixed amount of delay (denoted as arbitration inter-frame spacing, AIFS). The AIFS duration may vary based on traffic category. After AIFS, the transmitter further waits for a random period of time, denoted as random backoff 101. During random backoff 101, if the transmitter detects another transmission via the same communication medium, the transmitter will wait until the detected transmission is finished, and then continues the random backoff 101 countdown.

After random backoff 101, the transmitter can transmit a packet 102. After receiving packet 102, the receiver waits for a small time interval (denoted as short interframe space, SIFS), before sending an acknowledgement 104. Subsequently, the transmitter waits for another AIFS and random backoff before transmitting a packet 106.

Correspondingly, the receiver waits for an SIFS before sending ACK 108. In the same manner, the transmitter can transmit the next packet 110, and receives a corresponding acknowledgement 112.

As can be seen in the example in FIG. 1A, the transmission of a single packet requires a significant amount of idle waiting (AIFS, random backoff, and SIFS). Furthermore, each packet requires a separate ACK. These requirements incur a significant overhead for transmission.

To mitigate such inefficiency, the IEEE 802.11n standard introduced packet aggregation and block acknowledgement mechanism. With packet aggregation, an aggregate frame includes multiple packets to the same destination, which are combined into a single transmission unit. Typically, an aggregate frame can include up to 64 packets. After the transmission, the receiver waits for a fixed amount of delay (SIFS) before sending a block acknowledgement (BLOCK ACK). A BLOCK ACK contains a beginning sequence number, which corresponds to the sequence number of the earliest packet in the aggregate frame, and a bitmap corresponds to all the packets encapsulated in the aggregate frame. Note that a BLOCK ACK can only acknowledge a continuous number of packets, due to the sequential nature of the bitmap.

FIG. 1B illustrates an example of transmitting three aggregate frames in an IEEE 802.11n network. In this example, after waiting for AIFS and a random backoff period, the transmitter transmits aggregate frame 122. Subsequently, the receiver waits for SIFS and sends back a BLOCK ACK 124. A similar process take place when the transmitter transmits aggregate frame 126 and aggregate frame 130. The receiver sends back corresponding BLOCK ACKS 128 and 132.

Ideally, the packet aggregation mechanism in IEEE 802.11n is expected to improve the transmission efficiency of the wireless link to about 65%, compared with 40% in IEEE 802.11a/b/g. This improvement is mainly due to the amortization of the various overhead over a group of packets in 802.11n, as opposed to a single packet in 802.11a/b/g.

However, the aggregation and block acknowledgement mechanism in 802.11n still have some drawbacks. The transmitter and receiver typically negotiate the BLOCK ACK window (BAW), which is the maximum length of the transmission history for retransmissions. This window imposes a limit on the end throughput. Furthermore, the packet aggregation is on a per-traffic category (or traffic category) basis (in 802.11n terminology, on a per traffic identifier, or TID, basis). Hence, when the transmitter has two traffic from two or more different categories (e.g., voice and data), the transmission efficiency is further reduced.

Figure 2B:
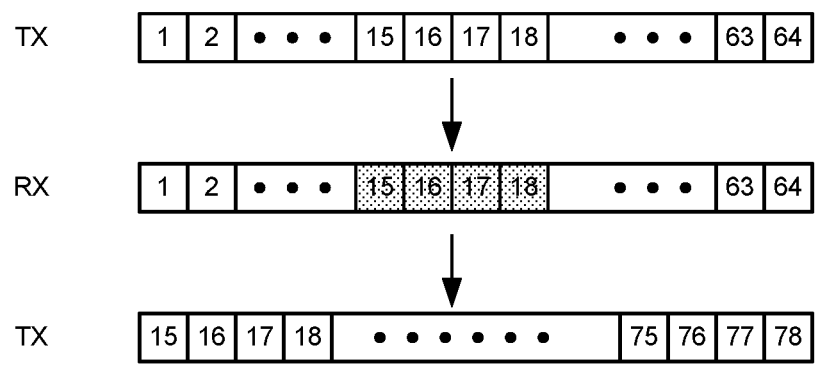
FIG. 2B illustrates a retransmission process in a conventional wireless network where four packets in the middle of an aggregate frame, which includes 64 packets, are not received successfully.
Figure 2C:
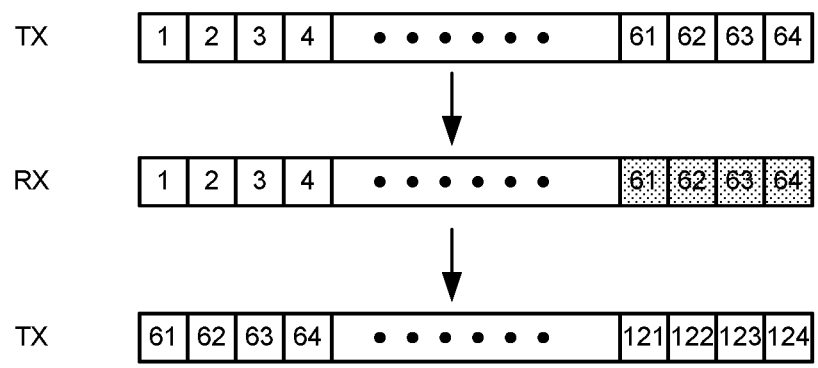
FIG. 2C illustrates a retransmission process in a conventional wireless network where four packets in the tail of an aggregate frame, which includes 64 packets, are not received successfully.

FIGS. 2A, 2B, and 2C illustrate how the BAW can restrict the end throughput. FIG. 2A illustrates a retransmission process in a conventional wireless network where the first four packets in an aggregate, which includes 64 packets, are not received successfully. In this example, the sender transmits an aggregate frame containing 64 packets with the same TID, with sequence numbers 1 to 64. Packets with sequence numbers 65 and up are stored in a queue, assuming that the BAW is 64. Assume that the receiver receives the aggregate frame. However, packets 1 to 4 are received with an error (as indicated by a shaded pattern in FIG. 2A). The receiver then sends the BLOCK ACK to the sender. In response, the sender retransmits packets 1 to 4 in the next aggregate frame. However, since the BAW is 64, and since the BLOCK ACK can only acknowledge a group of continuous 64 packets, the retransmitted aggregate frame cannot accommodate any packet with sequence number higher than 64.

Hence, the total number packets in the retransmitted aggregate frame is 4, and the aggregate frame cannot carry any new packet. This error scenario can reduce the link efficiency by 50%.

FIG. 2B illustrates a retransmission process in a conventional wireless network where four packets in the middle of an aggregate frame, which includes 64 packets, are not received successfully. In this example, the sender transmits an aggregate frame with packets of sequence numbers 1 to 64. After the receiver receives the aggregate frame, assume that packets 15 to 18 are in error. The receiver then sends a BLOCK ACK to the sender indicating that these four packets need to be retransmitted. In response, the sender assembles a retransmission aggregate frame, starting with packets 15 to 18. In addition, the sender can also include packets 65 to 78 in the same aggregate frame, as allowed by the BAW (that is, the receiver can subsequently acknowledge packets 15 to 78). In this scenario, the total number of packets in the retransmission frame is 18, 14 of which are new packets. The link efficiency is reduced by 40% due to the above error scenario.

FIG. 2C illustrates a retransmission process in a conventional wireless network where four packets in the tail of an aggregate frame, which includes 64 packets, are not received successfully. In this example, the sender initially sends packets 1 to 64. Assume that packets 61 to 64 are received in error. The receiver then sends back a BLOCK ACK indicating that packets 61 to 64 need to be retransmitted. In response, the sender assembles a retransmission aggregate frame, which contains packets 61 to 64. In addition, the sender can also include frames 65 to 124 in the same aggregate frame, since the BAW allows 64 continuous packets. Hence, in this scenario, the retransmission frames includes a total number of 64 packets, 60 of which are new packets. The link efficiency is reduced by only 4% due to the above error scenario.

As illustrated in the examples above, the wireless link's transmission efficiency can vary from 50% to 96% of its designed value, even with a packet error rate as low as 6.25% (4 error packets out of 64). This is because the BLOCK ACK can only acknowledge a group of continuous packets, which prevents the retransmission aggregate frame from fully utilizing the maximum slots allowed by the BAW. Real-world wireless links, especially outdoor ones, can exhibit far higher packet error rates, resulting in further degraded link efficiency.

A further limitation of the 802.11n aggregation mechanism is that it only allows an aggregate frame to carry packet from the same traffic category (i.e., with the same TID). For example, if the sender needs to transmit 64 packets in TID 0 and 2 packets in TID 1. Assuming TID 1 is associated with a higher priority than TID 0, the sender will assemble a first aggregate frame with only 2 packets from TID 1, despite the fact that it has 64 packets in TID 0 waiting to be transmitted. These aggregate frames still need to go through the standard fixed/random delays and BLOCK ACK mechanisms separately. Hence, even under excellent transmission conditions the link usage efficiency is reduced.

Embodiments of the present invention solve the aforementioned problems by using virtual sequence numbers and virtual TIDs in the aggregate frame, which allows the sender to fully utilize the maximum number of packet slots in an aggregate frame allowed by the BAW, even when retransmitting packets. The original sequence number and TID are moved to the payload portion of each 801.11n packet. The sequence number and TID fields in each packet's 802.11n header are updated with the virtual sequence number and TID values. FIG. 3A and its corresponding description below explain the operation of transmitter and receiver in accordance with the existing 802.11n standard. FIG. 4 and its corresponding description explain the operation of the transmitter and receiver using the virtual sequence numbers and TIDs, in accordance with embodiments of the present invention.

In the example illustrated in FIG. 3A, a transmitting station 301 includes a network protocol stack 302, and 802.11 encapsulation module 304, a set of per TID queues 306, a per TID aggregation release module 308, and a transmitter 310. A receiving station 321 includes a receiver 312, a set of per-TID de-aggregation reorder buffers 314, a per TID de-aggregation release module 316, a 802.11 decapsulation module 318, and a network protocol stack 320.

During operation, network protocol stack 302 assembles traffic from upper layers (such as TCP/IP) into layer-2 packets. 802.11 encapsulation module 304 encapsulates the packets with 802.11 headers (which are described in more detail in conjunction with FIG. 3B). Per TID aggregation queues 306 temporarily store the packets, based on their respective TIDs, in separate queues while waiting for the transmission medium to be available for transmission (e.g., when the system waits for AIFS and random backoff). When the transmission medium becomes available for transmission, per TID aggregation release module 308 selects a TID-specific queue (which can be based on a traffic prioritization policy) and releases an aggregate frame which contains packets from the selected queue. Transmitter 310 then transmits the aggregate frame via a wireless link to receiver 312.

After receiver 312 receives the aggregate frame, the packets in the aggregate frame are de-aggregated, reordered, and stored in one of the per TID buffers 314. The packets are temporarily stored in per TID buffers 314 while waiting for the upper-layer modules are ready to retrieve the packets. Subsequently, per TID de-aggregation release module 316 releases the packets in a particular per TID buffer, upon which 802.11 decapsulation module 318 removes the 802.11 headers from the packets. Subsequently, the decapsulated packets are forwarded to network protocol stack 320.

FIG. 3B illustrates a conventional IEEE 802.11n packet header format. As mentioned above, each packet is encapsulated with an IEEE 802.11n header before it is aggregated into an aggregate frame. As illustrated in FIG. 3B, an IEEE 802.11n header includes a frame control (FC) field, a duration/ID (DUR-ID) field, four address fields (ADDR1, ADDR2, ADDR3, and ADDR4), a sequence control field (SEQ-CTRL), a QoS control field (QOS-CTRL), and a SubNetwork Access Protocol header (SNAP-HDR).

The FC field contains control information used for defining the type of 802.11 MAC frame and providing information necessary for the following fields to understand how to process the MAC frame.

The DUR-ID field is used for all control type frames, except with the subtype of Power Save (PS) Poll, to indicate the remaining duration needed to receive the next frame transmission. When the sub-type is PS Poll, the field contains the association identity (AID) of the transmitting station.

Depending on the frame type, the four address fields can contain a combination of the following address types: base service set identification (BSSID), destination address (DA), source address (SA), receiver address (RA), and transmitter address (TA).

The SEQ-CTRL field includes a sequence number and a fragment number. The sequence number indicates the sequence number of each packet. The sequence number is the same for each packet sent from a fragmented packet. Otherwise, the sequence number is incremented by one until it reaches 4095, when it begins at zero again. The fragment number indicates the number of each frame sent that belongs to a fragmented frame.

The QOS-CTRL field indicates the QoS parameters of the packet. In particular, the QOS-CTRL field includes a TID subfield, which indicates the traffic category.

In embodiments of the present invention, on the transmission side, the process of per TID aggregation release is now replaced by a multi-TID aggregation release process. Furthermore, a packet's sequence number in the 802.11n header is now replaced with a virtual sequence number, and the packet's original sequence number is moved inside the payload of the encapsulated 802.11n packet.

Figure 4A:
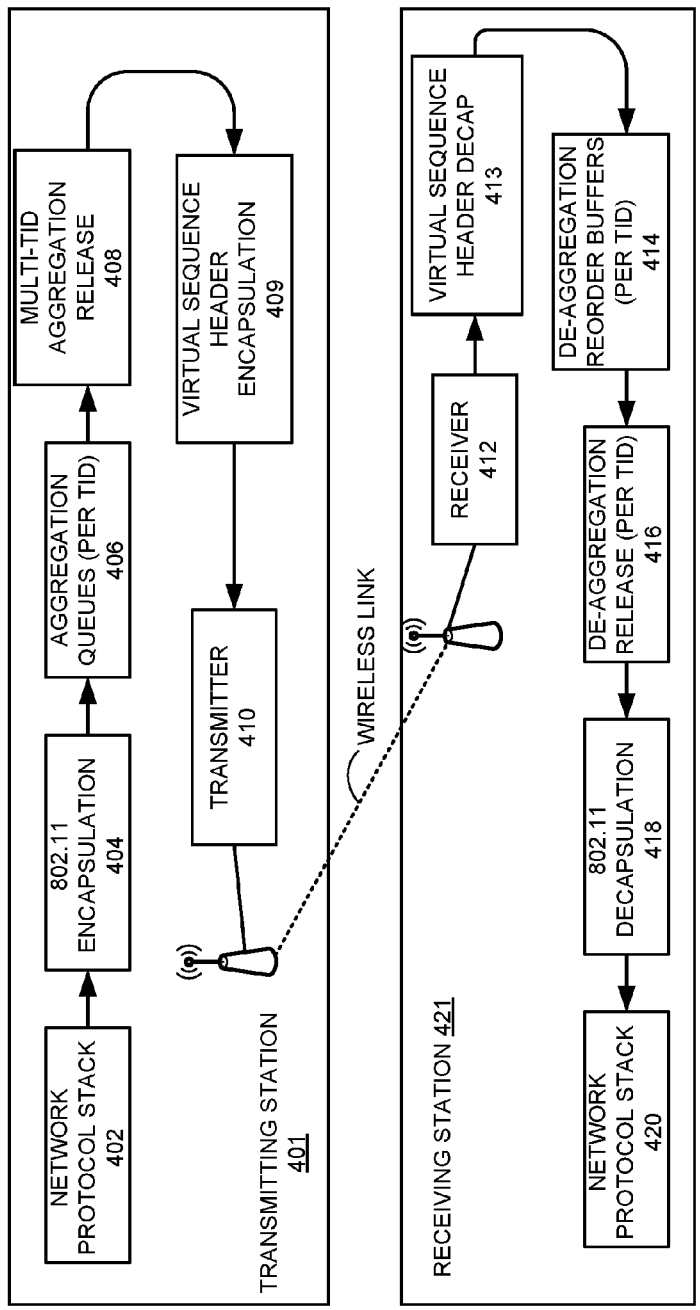
FIG. 4A presents a block diagram illustrating the operation of aggregating multiple packets with virtual sequence headers and transmitting the aggregate frame over a wireless link to a receiver, in accordance with one embodiment of the present invention.

FIG. 4A presents a block diagram illustrating the operation of aggregating multiple packets with virtual sequence headers and transmitting the aggregate frame over a wireless link to a receiver, in accordance with one embodiment of the present invention. In this example, a transmitting station 401 includes a network protocol stack 402, which provides the packets to be encapsulated in 802.11n headers by an IEEE 802.11 encapsulation module 404. Note that at this stage, the packets still retain their original sequence numbers and TIDs. Subsequently, the 802.11n encapsulated packets are buffered in a set of per TID aggregation queues 406 while transmitting station 401 waits for the transmission medium to become available. When the medium becomes available, a multi-TID aggregation release module retrieves a number of packets from per TID queues 406. Note that the aggregate frame may contain packets associated with different TIDs, and these packets' sequence numbers can be non-continuous within each TID. As long as there are a sufficient number of packets buffered in aggregation queues 406, multi-TID aggregation release module 408 can always release the maximum number of packets allowed by the BAW. Note that in some embodiments packets belonging to higher-priority TIDs are released for assembly before those of lower-priority TIDs. Furthermore, both retransmitted packets and new packets can be released, without the constraint of having all the packets in the aggregate frame being continuous and from the same TID.

Next, a virtual sequence header encapsulation module 409 updates the sequence number field and TID field in each packet's 802.11n header with a virtual sequence number and a virtual TID number, respectively. For all the packets in a given aggregate frame, their virtual sequence numbers are continuous (for example, from 1 to 64). All the packets in the aggregate frame also have the same virtual TID value. In addition, while updating the sequence number and TID field for each packet, virtual sequence header encapsulation module 409 also moves the packet's original sequence number and TID into the payload portion of the 802.11n encapsulated packet. More details on the modified 802.11n header format are provided below in conjunction with FIG. 4B.

The aggregate frame, which contains all the released and modified packet, is then provided to a transmitter 410, which transmits the aggregate frame over a wireless link to a receiving station 421. After a receiver 412 receives the aggregate frame, a virtual sequence header decapsulation module 413 decapsulates the aggregate frame and restores the original sequence number and TID in the 802.11n header for each packet. Subsequently, the packets are reordered and buffered in a set of per TID de-aggregation reorder buffers 414. A per TID de-aggregation release module 416 then releases the packets from buffers 414 to a 802.11 decapsulation 418, which removes a packet's 802.11n header and forwards the packet to a network protocol stack 420. Note that receiving station 421 responds back to transmitting station 421 with a block acknowledgement containing a bitmap corresponding to the virtual sequence numbers.

Figure 4B:
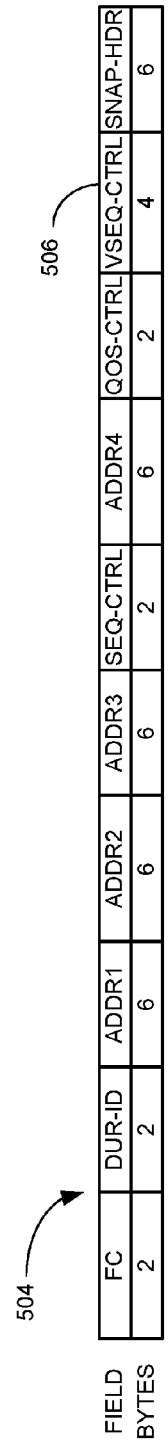
FIG. 4B presents a modified IEEE 802.11n header that facilitates virtual sequence number and virtual traffic ID (TID), in accordance with one embodiment of the present invention.

FIG. 4B presents a modified IEEE 802.11n header that facilitates virtual sequence number and virtual traffic ID (TID), in accordance with one embodiment of the present invention. In this example, an 802.11n header 504's SEQ-CTRL field contains the virtual sequence number. In addition, header 504's QOS-CTRL field contains the virtual TID. An additional virtual sequence control field 506 (VSEQ-CTRL), which in one embodiment can be four bytes long, is inserted after the QOS-CTRL field (the position where conventional packet payload begins). VSEQ-CTRL field 506 contains the packet's original sequence number and TID.

Because the virtual sequence numbers do not have actual meanings and are only used to allow the receiving station to send a BLOCK ACK that acknowledges all the packets in the aggregate frame, the virtual sequence numbers can be restarted for every transmission. In other words, the transmission can be stateless. Note that the transmitting station might need to retain the virtual-to-original sequence number and TID mapping until the BLOCK ACK is received, so that in case of transmission error the transmitting station can identify the correct packets to retransmit.

Because of the flexibility afforded by the virtual sequence number and TID, the transmitting station can reserve packet slots in the aggregate frame for redundancy purposes, in order to mitigate non-ideal transmission conditions. For example, the transmitting station may randomly select 20% of the highest-priority packets and duplicate them in each aggregate frame to reduce the total packet error rate, if the packet error rate surpasses a predetermined threshold. Furthermore, the transmitting station can monitor the packet error rate for each TID, and dynamically replicate packets for each TID based on a predetermined QoS policy. When allocating reserved packet slots for duplicate packets, the transmitting station can use various methods (such as strict priority based or round robin) to ensure the desired QoS parameters are met.

Figure 5:
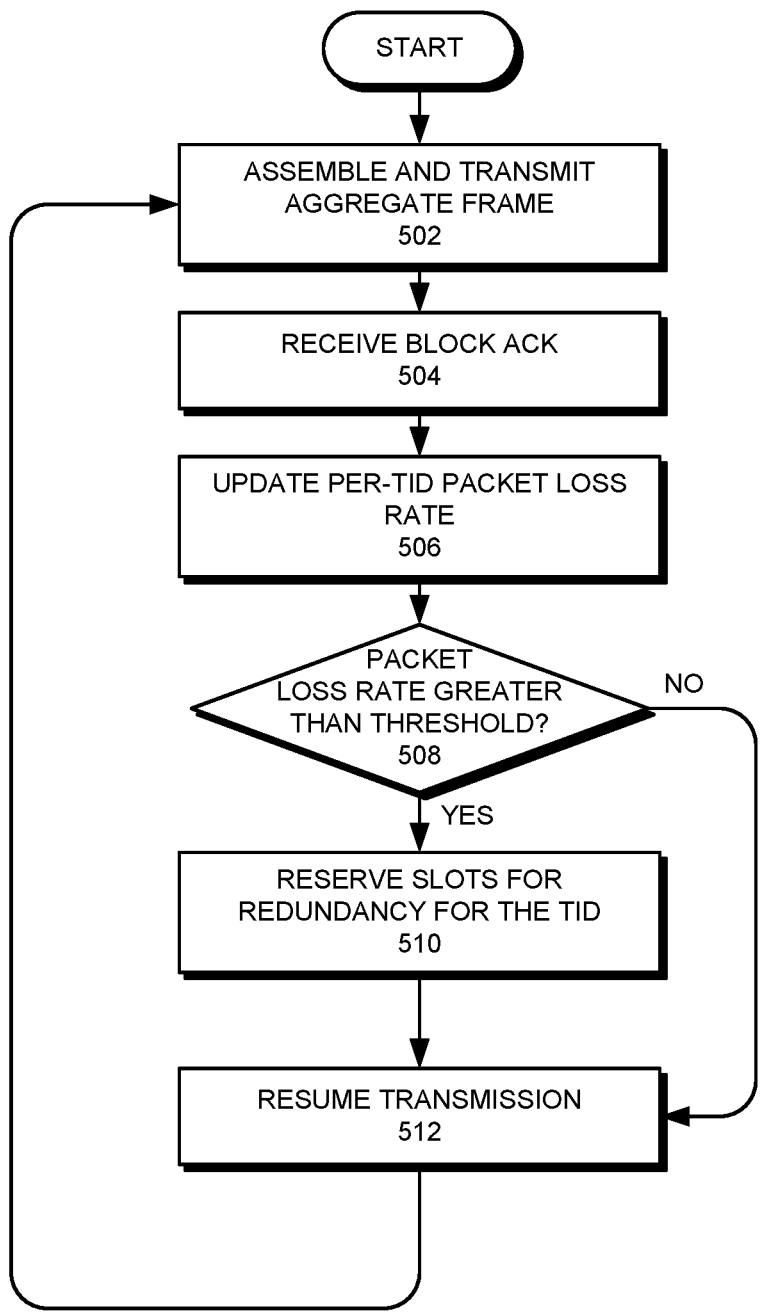
FIG. 5 presents a flowchart illustrating the process of reserving packet slots in an aggregate frame based on detected packet error rate associated with a traffic category, in accordance with one embodiment of the present invention.

FIG. 5 presents a flowchart illustrating the process of reserving packet slots in an aggregate frame based on detected packet error rate associated with a traffic category, in accordance with one embodiment of the present invention. During operation, a transmitting station first assembles and transmits a multi-TID aggregate frame (operation 502). The transmitting station then receives a BLOCK ACK from the receiving station (operation 504). Based on the received BLOCK ACK, the transmitting station updates its record of per-TID packet error rate (operation 506). The transmitting station then determines, for each TID, whether the packet error rate is greater than a threshold for that TID (operation 508). If so, the transmitting station reserves a number of packet slots in the aggregate frame for duplicate packets of that TID (operation 510) prior to resuming transmission (operation 512). If the per-TID packet error rate is below the threshold, the transmitting station resumes transmission (operation 512). The process repeats itself by looping back to operation 502.

Figure 6:
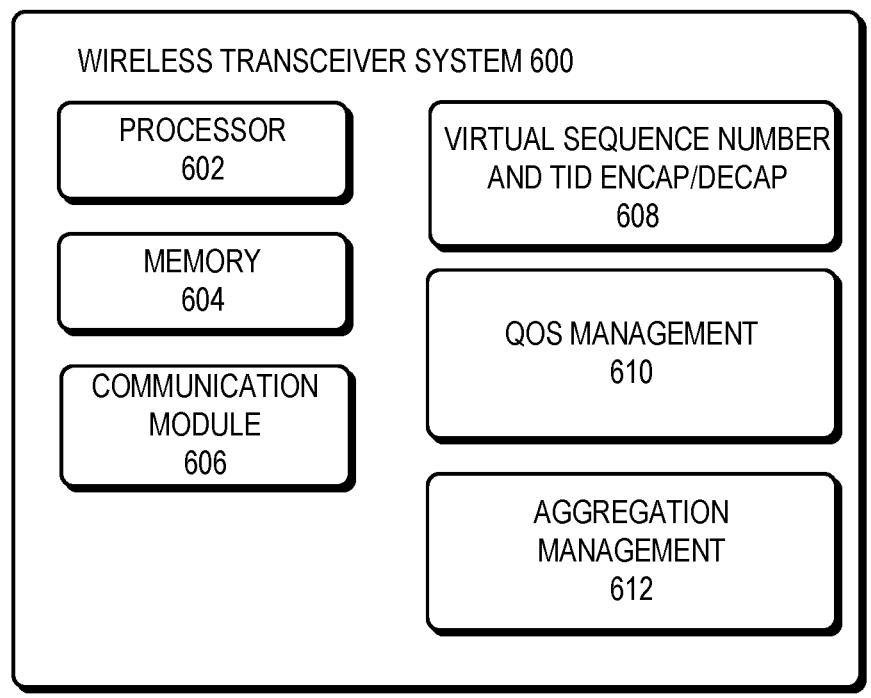
FIG. 6 illustrates an exemplary transceiver system that facilitates virtual sequence number for wireless transmission in an IEEE 802.11 wireless link, in accordance with one embodiment of the present invention.

FIG. 6 illustrates an exemplary transceiver system that facilitates virtual sequence number for wireless transmission in an IEEE 802.11 wireless link, in accordance with one embodiment of the present invention. In this example, a wireless transceiver system 600 includes a processor 602, a memory 604, and a communication module 606. Also included in transceiver system 600 are a virtual sequence number and TID encapsulation/decapsulation module 608, a QoS management module 610, and an aggregation management module 612.

Communication module 606 may include a wireless radio that is responsible for transmitting and receiving physical signals. Virtual sequence number and TID encapsulation/decapsulation module 608 is responsible for modifying the 802.11n headers to include virtual sequence numbers and virtual TIDs, and for restoring a packet's original sequence number and TID on the receiving side. QoS management module 610 is responsible for enforcing any QoS policy. Aggregation management module 612 is responsible for assembling aggregate frames and handling retransmission in case of packet error.

Note that virtual sequence number and TID encapsulation/decapsulation module 608, QoS management module 610, and aggregation management module 612 may be implemented in software, which means they can be based on instructions stored in a storage device, loaded into memory 604, and, when executed by processor 602, perform the functions described above. These modules can also be implemented partly or entirely in hardware, using application specific integrated circuits (ASICs) or field programmable logic arrays (FPGAs).

The methods and processes described in the detailed description section can be embodied as code and/or data, which can be stored in a computer-readable storage device as described above. When a computer system reads and executes the code and/or data stored on the computer-readable storage device, the computer system performs the methods and processes embodied as data structures and code and stored within the computer-readable storage medium.

Furthermore, methods and processes described herein can be included in hardware modules or apparatus. These modules or apparatus may include, but are not limited to, an ASIC chip, an FPGA, a dedicated or shared processor that executes a particular software module or a piece of code at a particular time, and/or other programmable-logic devices now known or later developed. When the hardware modules or apparatus are activated, they perform the methods and processes included within them.

Although the examples presented herein are based on IEEE 802.11n wireless links, embodiments of the present invention are not limited only to such links. Other types of wireless links based on existing or future standards (including IEEE 802.11 family and other protocols) can also use various embodiments of the present invention. The claims herein should be not be interpreted as being limited only to IEEE 802.11n wireless links.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for wireless link transmission, comprising:
receiving a block acknowledgement from a destination device in response to sending a first multi-traffic identifier (TID) aggregate frame to the destination device via a wireless link, wherein each of the packets of a respective multi-TID aggregate frame have the same virtual traffic identifier (virtual TID) in a corresponding packet header, and wherein two or more packets in the multi-TID aggregate frame have different original traffic identifiers (TIDs) in a corresponding packet payload;
computing a TID packet error rate for a respective TID based at least on the block acknowledgement;
in response to determining that the TID packet error rate for the respective TID is greater than a predetermined threshold, reserving a number of packet slots in a second aggregate frame for duplicate packets of the respective TID;
generating the second multi-TID aggregate frame that includes duplicate packets for the respective TID in the number of reserved packet slots; and
sending the second multi-TID aggregate frame to the destination device via the wireless link.

2. The method of claim 1, wherein computing the TID packet error rate involves monitoring an error rate for a respective original TID in one or more aggregate frames.

3. The method of claim 1, wherein a respective reserved packet slot of the second multi-TID aggregate frame includes a duplicate packet that is a duplicate of another packet in the second aggregate frame.

4. The method of claim 3, wherein the duplicate packet and the other packet have the same original TID and the same original sequence number.

5. The method of claim 3, wherein the duplicate packet and the other packet have the same virtual TID and different virtual sequence numbers.

6. The method of claim 1, wherein sending the second multi-TID aggregate frame to the destination device over the wireless link involves transmitting the second multi-TID aggregate frame over an IEEE 802.11 wireless link.

7. The method claim 1, wherein the packets in the respective multi-TID aggregate frame have continuous virtual sequence numbers.

8. The method claim 1, wherein the packets in the respective multi-TID aggregate frame have non-continuous original sequence numbers.

9. A non-transitory computer-readable storage medium storing instructions that when executed by a computer cause the computer to perform a method, the method comprising:
receiving a block acknowledgement from a destination device in response to sending a first multi-traffic identifier (TID) aggregate frame to the destination device via a wireless link, wherein each of the packets of a respective multi-TID aggregate frame have the same virtual traffic identifier (virtual TID) in a corresponding packet header, and wherein two or more packets in the multi-TID aggregate frame have different original traffic identifiers (TIDs) in a corresponding packet payload;
computing a TID packet error rate for a respective TID based at least on the block acknowledgement;
in response to determining that the TID packet error rate for the respective TID is greater than a predetermined threshold, reserving a number of packet slots in a second aggregate frame for duplicate packets of the respective TID;
generating the second multi-TID aggregate frame that includes duplicate packets for the respective TID in the number of reserved packet slots; and
sending the second multi-TID aggregate frame to the destination device via the wireless link.

10. The non-transitory computer-readable storage medium of claim 9, wherein computing the TID packet error rate involves monitoring an error rate for a respective original TID in one or more aggregate frames.

11. The non-transitory computer-readable storage medium of claim 9, wherein a respective reserved packet slot of the second multi-TID aggregate frame includes a duplicate packet that is a duplicate of another packet in the second aggregate frame.

12. The non-transitory computer-readable storage medium of claim 11, wherein the duplicate packet and the other packet have the same original TID and the same original sequence number.

13. The non-transitory computer-readable storage medium of claim 11, wherein the duplicate packet and the other packet have the same virtual TID and different virtual sequence numbers.

14. The non-transitory computer-readable storage medium of claim 9, wherein sending the second multi-TID aggregate frame to the destination device over the wireless link involves transmitting the second multi-TID aggregate frame over an IEEE 802.11 wireless link.

15. A system of wireless link transmission, comprising:
a network protocol stack operable to a block acknowledgement from a destination device in response to sending a first multi-traffic identifier (TID) aggregate frame to the destination device via a wireless link, wherein each of the packets of a respective multi-TID aggregate frame have the same virtual traffic identifier (virtual TID) in a corresponding packet header, and wherein two or more packets in the multi-TID aggregate frame have different original identifiers (TIDs) in a corresponding packet payload;
a monitoring circuit operable to compute a TID packet error rate for a respective TID based at least on the block acknowledgement;
an aggregation release circuit operable to:
determine that the TID packet error rate for the respective TID is greater than a predetermined threshold;
reserve a number of packet slots in a second aggregate frame for duplicate packets of the respective TID in response to; and
generate the second multi-TID aggregate frame that includes duplicate packets for the respective TID in the number of reserved packet slots; and
a transmitter operable to send the second multi-TID aggregate frame to the destination device via the wireless link.

16. The system of claim 15, wherein the monitoring circuit is further operable to monitor an error rate for a respective original TID in one or more aggregate frames.

17. The system of claim 15, wherein a respective reserved packet slot of the second multi-TID aggregate frame includes a duplicate packet that is a duplicate of another packet in the second aggregate frame.

18. The system of claim 17, wherein the duplicate packet and the other packet have the same original TID and the same original sequence number.

19. The system of claim 17, wherein the duplicate packet and the other packet have the same virtual TID and different virtual sequence numbers.

20. The system of claim 15, wherein while sending the second multi-TID aggregate frame to the destination device, the transmitter is further operable to transmit the second multi-TID aggregate frame over an IEEE 802.11 wireless link.

* * * * *

UNITED STATES PATENT AND TRADEMARK OFFICE
CERTIFICATE OF CORRECTION

| | |
|---|---|
| PATENT NO. | : 9,985,749 B2 |
| APPLICATION NO. | : 15/098223 |
| DATED | : May 29, 2018 |
| INVENTOR(S) | : Sriram Dayanandan et al. |

Page 1 of 1

It is certified that error appears in the above-identified patent and that said Letters Patent is hereby corrected as shown below:

Column 11, Line 28 should read "gate frame have different original traffic identifiers (TIDs) in"

Signed and Sealed this
Tenth Day of July, 2018

Andrei Iancu
*Director of the United States Patent and Trademark Office*